United States Patent
Hansen et al.

(10) Patent No.: US 8,814,678 B2
(45) Date of Patent: Aug. 26, 2014

(54) APPARATUS AND METHOD FOR GYRO-CONTROLLED GAMING VIEWPOINT WITH AUTO-CENTERING

(75) Inventors: Scott Robert Hansen, Vancouver (CA); Shigeru Miyamoto, Kyoto (JP); Yoshihito Ikebata, Kyoto (JP); Ryuichi Nakada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 159 days.

(21) Appl. No.: 13/152,829

(22) Filed: Jun. 3, 2011

(65) Prior Publication Data

US 2012/0309518 A1     Dec. 6, 2012

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .................... 463/31; 463/32; 463/33; 463/34

(58) Field of Classification Search
USPC .......................................................... 463/31
See application file for complete search history.

(56) References Cited

U.S. PATENT DOCUMENTS

| | | |
|---|---|---|
| 2003/0216176 A1 | 11/2003 | Shimizu et al. |
| 2005/0009602 A1 | 1/2005 | Nishimura |
| 2009/0247250 A1 | 10/2009 | Kato et al. |
| 2009/0303204 A1 | 12/2009 | Nasiri et al. |
| 2010/0279770 A1 | 11/2010 | Ikeda |

OTHER PUBLICATIONS

Super Mario 64, Jun. 23, 1996, Nintendo, game manual and YouTube video: http://www.youtube.com/watch?v=KSmjle5y8GI.*
Super Monkey Ball: Banana Blitz, Nov. 14, 2006, Sega, game manual and YouTube video: http://www.youtube.com/watch?v=FswRTnRO3zE.*
Analog Devices, May 9, 2006, http://www.analog.com/en/press-release/May_09_2006_ADI_Nintendo_Collaboration/press.html.*
American McGee's Alice, Oct. 6, 2000, Rogue Entertainment and Westlake Interactive, EA Games, manual and YouTube video http://www.youtube.com/watch?v=PBsPMCxhqgE.*
European Search Report issued for corresponding European Patent Application No. 12170671.7, dated Sep. 26, 2012.

* cited by examiner

*Primary Examiner* — Kevin Y Kim
(74) *Attorney, Agent, or Firm* — Nixon & Vanderhye, P.C.

(57) ABSTRACT

An apparatus and method is provided for gyro-controlled gaming viewpoint with auto-centering. A virtual camera is positioned at a first position while the virtual camera views a first object at a first direction. Once the system moves, the virtual camera moves to a second position based on a measurement by an angular velocity sensor. While the virtual camera moves to the second position, the viewing direction of the virtual camera simultaneously so as to keep the first object positioned in a same position of a viewing direction of the virtual camera. The apparatus and method allow the system to move a virtual camera based on a measurement of a gyroscope while keeping an object of importance in the center of the field-of-view of the virtual camera.

29 Claims, 13 Drawing Sheets

FIG. 7
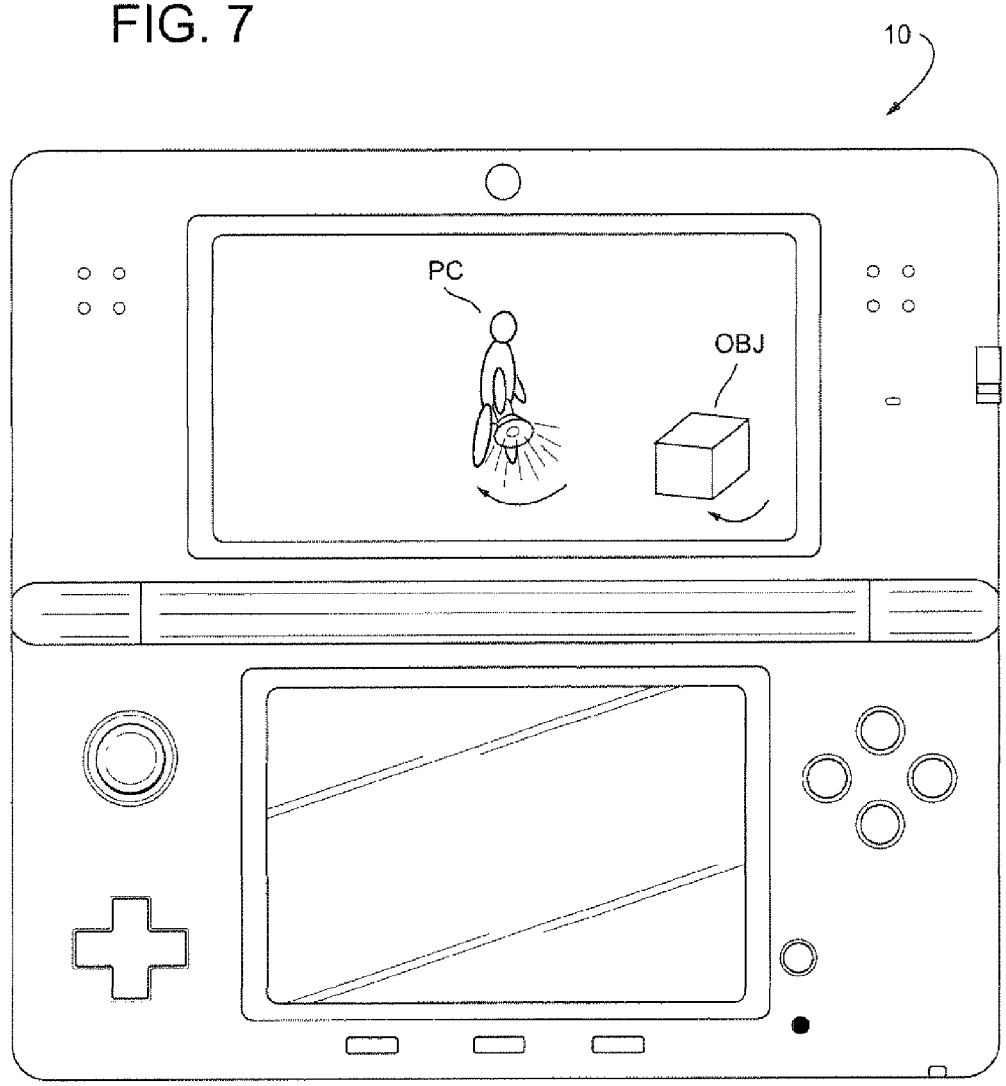
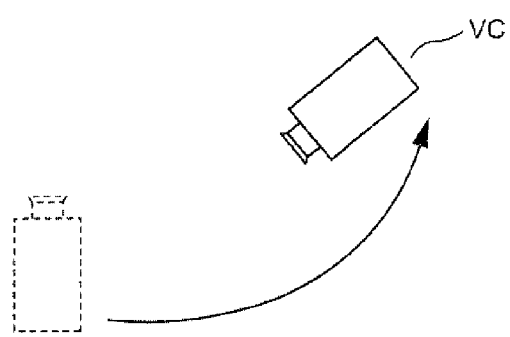

APPARATUS AND METHOD FOR GYRO-CONTROLLED GAMING VIEWPOINT WITH AUTO-CENTERING

BACKGROUND

In conventional video game software environments, a player character moves around a display screen, often times based on inputs by a player. Additionally, player inputs may also move the visual perspective of the player character, for example, if the game was played in a first person view of the player character. Traditionally, player inputs to move the character or the virtual camera were implemented using controllers having cross-switches and buttons.

The advent of motion based controller input now allows for a player to input commands to the player character by moving and/or tilting the controller device itself. The motion based controller input is not only used in home-based video game entertainment devices, such as the Nintendo Wii for example, but is also used in portable video game entertainment devices, such as the Nintendo 3DS, for example. Motion sensing equipment, such as accelerometers or gyroscopes, can be used to determine how to change the view of the video game's virtual camera so that the player may "move" the view of the player character or move the field-of-view of the virtual camera.

For example, in a game where the field-of-view of the virtual camera is the player character's first person view, the movement of the portable entertainment device can move the player character's first person view. So if the player moves the portable entertainment device to the right, the field-of-view of the virtual camera will shift to the right. In some situations, if the player moves the device forward, the virtual camera will "zoom" forward as if the player is walking straight forward.

Moving the perspective of a virtual camera is not limited to situations where the game play is that of the player character's first person view. For example, some games allow players to control a virtual camera while viewing the actions of the player character in a third person view. Once again, the virtual camera will move relative to the movement of the portable entertainment device, so if the device moves to the right, the virtual camera will likewise move to the right.

Regardless of whether the viewpoint is that of a first person or third person view, the virtual camera will move relative to the movement of the portable electronic device. However, in these situations, an object of interest, whether it be the player character or another object, will move from the center of the virtual camera's field-of-view when the virtual camera moves relative to the movement of the portable electronic device. In many situations, the object of interest will move entirely out of the field-of-view of the virtual camera if the device is moved or tilted too far in one direction. This can be irritating to a player because the player may have to constantly reposition the gaming device to keep the object of interest in the field-of-view.

BRIEF SUMMARY

In order to address this issue, a game environment is presented where the virtual camera is auto-centered on an object of interest in the game environment. The system allows a player to change the direction and position of the virtual camera by using motion sensing technology in the portable electronic device. When viewing an object of interest, the field-of-view of the virtual camera will remain centered on the object of interest and will move relative to the object of interest. The object of interest can thus remain in the center of animated images even as the direction and position of the virtual camera change within the virtual world.

A method of controlling a virtual camera based on a tendency of an angular velocity sensor is provided. A virtual camera is positioned at a first position while the virtual camera views a first object at a first direction. Once the system moves, the virtual camera moves to a second position based on a change in an orientation of an angular velocity sensor. While the virtual camera moves, the viewing direction of the virtual camera changes so that an object of interest remains in a substantially center position of the viewing direction of the virtual camera.

A non-transitory computer-readable storage medium is disclosed having computer readable code embodied therein is provided for executing the virtual camera control method described in the preceding paragraph.

Another aspect relates to a gaming apparatus having a memory configured to store a program for controlling a virtual camera. The gaming apparatus also has an angular velocity sensor and a processor configured to control the virtual camera based on the orientation of the game apparatus as measured by the angular velocity sensor. The processor is further configured to position a virtual camera at a first position with the virtual camera viewing a first object at a first direction, move the virtual camera to a second position based on a change in orientation of the angular velocity sensor, and move the viewing direction of the virtual camera so that an object of interest remains in a substantially center position of the viewing direction of the virtual camera.

Yet another aspect relates to a method that uses a processor and generates a first image of a virtual object in a field of view of a virtual camera having an initial orientation and an initial position in a virtual world. The method detects a movement of a device using a gyro sensor, changes orientation of the virtual camera from the initial orientation based on the detected movement, and changes position of the virtual camera from the initial position based on the detected movement. The position of the virtual camera is changed simultaneously with the orientation of the virtual camera being change so that a location of the virtual object in at least a second generated image remains at the same location as in the first image. The location of the virtual object in the first and second images can be at the center of each of the respective images.

Another aspect relates to a system having a gyro sensor configured to output data in response to movement of a hand-held device. The system also has a computer processor configured to receive data output by the gyro sensor and generate a first image of a virtual object in a field of view of a virtual camera having an initial orientation and an initial position. Based on the received data, the position and the orientation of the virtual camera are changed from the initial orientation. The processor generates at least a second image of the virtual object in a field of view of the virtual camera having the changed orientation and the changed position so that a location of the virtual object in the second image remains at the same location as in the first image. The location of the virtual object in the first and second images can be at the center of each of the respective images.

In a non-limiting example implementation, the hand-held device includes a housing enclosing both the gyro sensor and the computer processor. The hand-held device may also have a display disposed on the device and configured to display the first and second images.

In a non-limiting example implementation, the virtual camera moves about the first object based on a change in angular rotation of the angular velocity sensor. The virtual camera may also move when the first object interacts with a second object.

In another non-limiting example implementation, the angular velocity sensor outputs movement information based on a change in angular rotation of the angular velocity sensor. In one embodiment, the virtual camera may move in a same direction of the change in orientation of the angular velocity sensor. In another embodiment, the virtual camera may move in an opposite direction of the change in orientation of the angular velocity sensor.

In yet another non-limiting example implementation, the first object is a player character and the virtual camera views the player character in a third-person view.

BRIEF DESCRIPTION OF THE DRAWINGS

FIG. 7 is an exemplary diagram showing an example where the game apparatus 10 is moved to a second position;

DETAILED DESCRIPTION OF THE DRAWINGS

Figure 1:
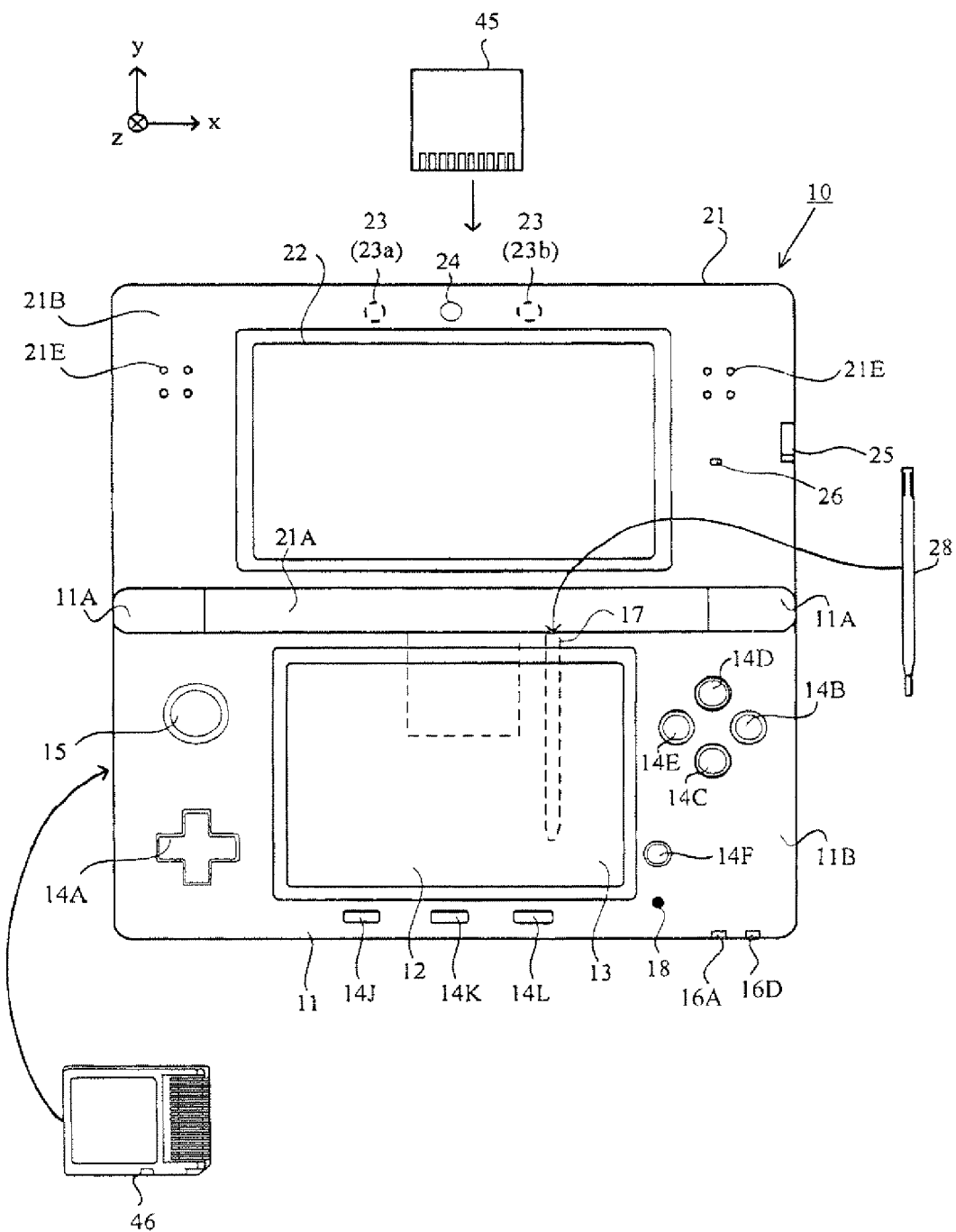
FIG. 1 is a front view showing an example of a game apparatus 10 in an open state.

A description is given of a specific example of an image processing apparatus that executes an image processing program according to an embodiment of the present system. The following embodiment, however, is merely illustrative, and the present system is not limited to the configuration of the following embodiment.

It should be noted that in the following embodiment, data processed by a computer is illustrated using graphs and natural language. More specifically, however, the data is specified by computer-recognizable pseudo-language, commands, parameters, machine language, arrays, and the like. The present embodiment does not limit the method of representing the data.

First, with reference to the drawings, a description is given of a hand-held game apparatus 10 as an example of the image processing apparatus that executes the image processing program according to the present embodiment. The image processing apparatus according to the present system, however, is not limited to a game apparatus. The image processing apparatus according to the present system may be a given computer system, such as a general-purpose computer. The image processing apparatus may also not be limited to a portable electronic gaming device and may be implemented on a home entertainment gaming device, such as the Nintendo Wii (including e.g., Wii MotionPlus attachment having gyroscope sensors), for example. A description of an example home entertainment gaming device can be found in U.S. application Ser. No. 12/222,873 (U.S. Patent Publication No. 2009/0181736) which is hereby incorporated by reference. The home entertainment gaming device can be played, for example, on a standard television, on a 3-D television, or even on a holographic television.

It should be noted that the image processing program according to the present embodiment is a game program. The image processing program according to the present system, however, is not limited to a game program. The image processing program according to the present system can be applied by being executed by a given computer system. Further, the processes of the present embodiment may be subjected to distributed processing by a plurality of networked devices, or may be performed by a network system where, after main processes are performed by a server, the process results are distributed to terminals, or may be performed by a so-called cloud network.

FIGS. 1, 2, 3A, 3B, 3C, and 3D are each a plan view showing an example of the appearance of the game apparatus 10. The game apparatus 10 shown in FIGS. 1 through 3D includes a capturing section (camera), and therefore is capable of capturing an image with the capturing section, displaying the captured image on a screen, and storing data of the captured image. Further, the game apparatus 10 is capable of executing a game program stored in an exchangeable memory card, or a game program received from a server or another game apparatus via a network. The game apparatus 10 is also capable of displaying on the screen an image generated by computer graphics processing, such as an image captured by a virtual camera set in a virtual space. It should be noted that in the present specification, the act of obtaining image data with the camera is described as "capturing", and the act of storing the image data of the captured image is described as "photographing".

Figure 2:
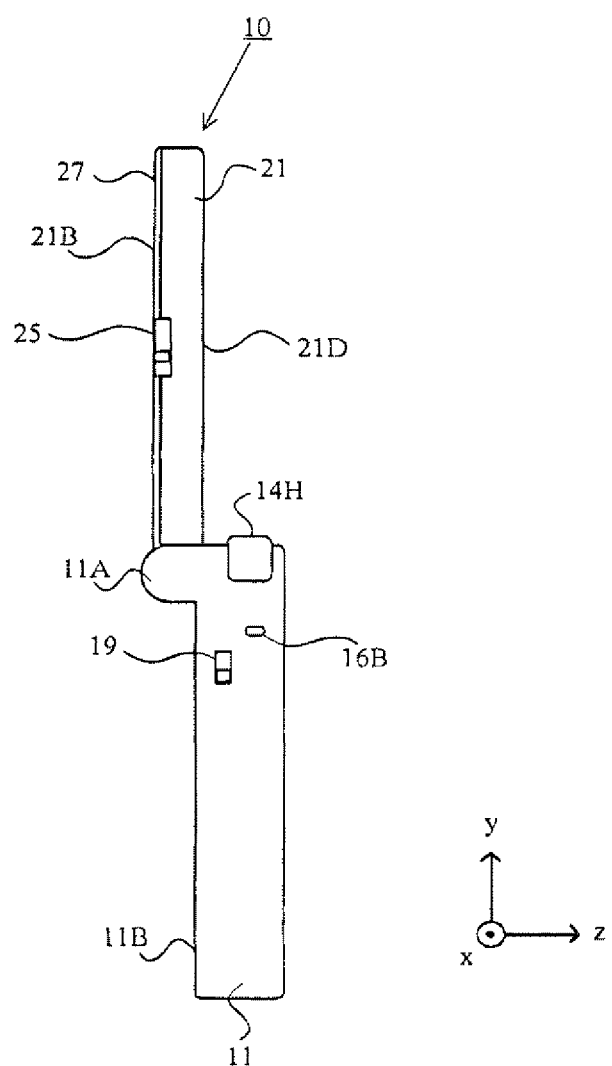
FIG. 2 is a side view showing an example of the game apparatus 10 in the open state.
Figure 3:
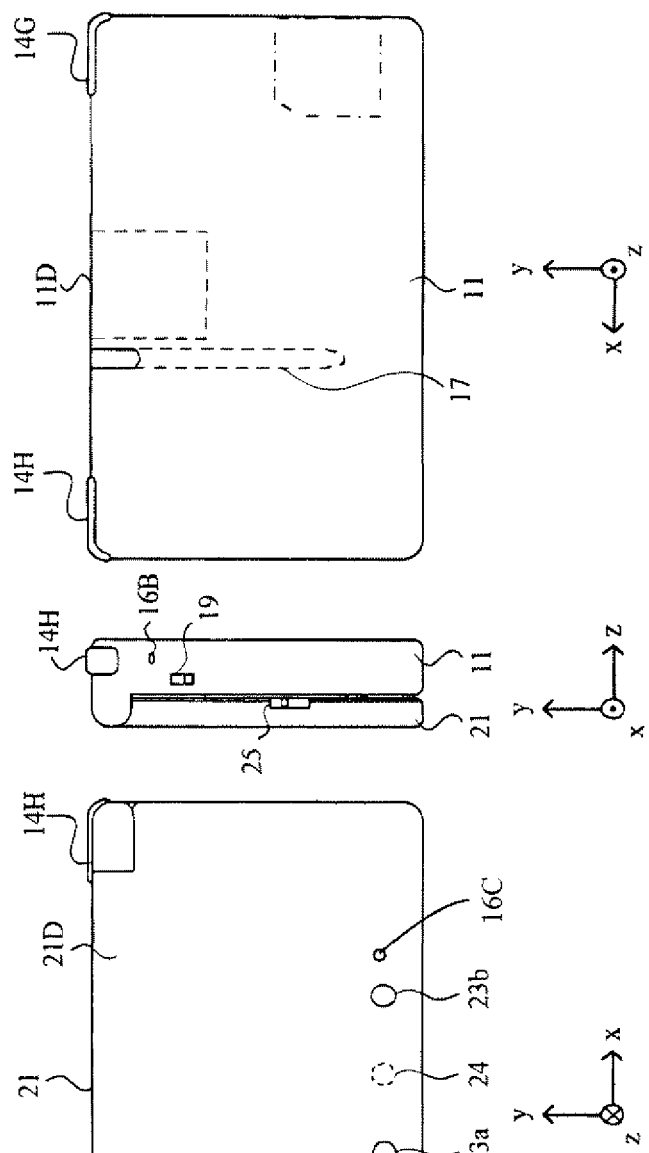
FIG. 3A is a left side view showing an example of the game apparatus 10 in a closed state.
FIG. 3B is a front view showing an example of the game apparatus 10 in the closed state.
FIG. 3C is a right side view showing an example of the game apparatus 10 in the closed state.
FIG. 3D is a rear view showing an example of the game apparatus 10 in the closed state.

The game apparatus 10 shown in FIGS. 1 through 3D includes a lower housing 11 and an upper housing 21. The lower housing 11 and the upper housing 21 are joined together by a hinge structure so as to be openable and closable in a folding manner (foldable). That is, the upper housing 21 is attached to the lower housing 11 so as to be rotatable (pivotable) relative to the lower housing 11. Thus, the game apparatus 10 has the following two forms: a closed state where the upper housing 21 is in firm contact with the lower housing 11, as seen for example in FIGS. 3A and 3C; and a state where the upper housing 21 has rotated relative to the lower housing 11 such that the state of firm contact is released (an open state). The rotation of the upper housing 21 is allowed to the position where, as shown in FIG. 2, the upper housing 21 and the lower housing 11 are approximately parallel to each other in the open state (see FIG. 2).

FIG. 1 is a front view showing an example of the game apparatus 10 being open (in the open state). A planar shape of each of the lower housing 11 and the upper housing 21 is a wider-than-high rectangular plate-like shape having a longitudinal direction (horizontal direction (left-right direction):

an x-direction in FIG. 1) and a transverse direction ((up-down direction): a y-direction in FIG. 1). The lower housing 11 and the upper housing 21 are joined together at the longitudinal upper outer edge of the lower housing 11 and the longitudinal lower outer edge of the upper housing 21 by a hinge structure so as to be rotatable relative to each other. Normally, a user uses the game apparatus 10 in the open state. The user stores away the game apparatus 10 in the closed state. Further, the upper housing 21 can maintain the state of being stationary at a desired angle formed between the lower housing 11 and the upper housing 21 due, for example, to a frictional force generated at the connecting part between the lower housing 11 and the upper housing 21. That is, the game apparatus 10 can maintain the upper housing 21 stationary at a desired angle with respect to the lower housing 11. Generally, in view of the visibility of a screen provided in the upper housing 21, the upper housing 21 is open at a right angle or an obtuse angle with the lower housing 11. Hereinafter, in the closed state of the game apparatus 10, the respective opposing surfaces of the upper housing 21 and the lower housing 11 are referred to as "inner surfaces" or "main surfaces." Further, the surfaces opposite to the respective inner surfaces (main surfaces) of the upper housing 21 and the lower housing 11 are referred to as "outer surfaces".

Projections 11A are provided at the upper long side portion of the lower housing 11, each projection 11A projecting perpendicularly (in a z-direction in FIG. 1) to an inner surface (main surface) 11B of the lower housing 11. A projection (bearing) 21A is provided at the lower long side portion of the upper housing 21, the projection 21A projecting perpendicularly to the lower side surface of the upper housing 21 from the lower side surface of the upper housing 21. Within the projections 11A and 21A, for example, a rotating shaft (not shown) is accommodated so as to extend in the x-direction from one of the projections 11A through the projection 21A to the other projection 11A. The upper housing 21 is freely rotatable about the rotating shaft, relative to the lower housing 11. Thus, the lower housing 11 and the upper housing 21 are connected together in a foldable manner.

The inner surface 11B of the lower housing 11 shown in FIG. 1 includes a lower liquid crystal display (LCD) 12, a touch panel 13, operation buttons 14A through 14L, an analog stick 15, a first LED 16A, a fourth LED 16D, and a microphone hole 18.

The lower LCD 12 is accommodated in the lower housing 11. A planar shape of the lower LCD 12 is a wider-than-high rectangle, and is placed such that the long side direction of the lower LCD 12 coincides with the longitudinal direction of the lower housing 11 (the x-direction in FIG. 1). The lower LCD 12 is provided in the center of the inner surface (main surface) of the lower housing 11. The screen of the lower LCD 12 is exposed through an opening of the inner surface of the lower housing 11. The game apparatus 10 is in the closed state when not used, so that the screen of the lower LCD 12 is prevented from being soiled or damaged. As an example, the number of pixels of the lower LCD 12 is 320 dots×240 dots (horizontal× vertical). Unlike an upper LCD 22 described later, the lower LCD 12 is a display device that displays an image in a planar manner (not in a stereoscopically visible manner). It should be noted that although an LCD is used as a display device in the first embodiment, any other display device may be used, such as a display device using electroluminescence (EL). Further, a display device having a desired resolution may be used as the lower LCD 12.

The touch panel 13 is one of input devices of the game apparatus 10. The touch panel 13 is mounted so as to cover the screen of the lower LCD 12. In the first embodiment, the touch panel 13 may be, but is not limited to, a resistive touch panel. The touch panel may also be a touch panel of any pressure type, such as an electrostatic capacitance type. In the first embodiment, the touch panel 13 has the same resolution (detection accuracy) as that of the lower LCD 12. The resolutions of the touch panel 13 and the lower LCD 12, however, may not necessarily need to be the same.

The operation buttons 14A through 14L are each an input device for providing a predetermined input. Among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11.

The cross button 14A is cross-shaped, and includes buttons for indicating at least up, down, left, and right directions, respectively. The cross button 14A is provided in a lower area of the area to the left of the lower LCD 12. The cross button 14A is placed so as to be operated by the thumb of a left hand holding the lower housing 11.

The button 14B, the button 14C, the button 14D, and the button 14E are placed in a cross formation in an upper portion of the area to the right of the lower LCD 12. The button 14B, the button 14C, the button 14D, and the button 14E, are placed where the thumb of a right hand holding the lower housing 11 is naturally placed. The power button 14F is placed in a lower portion of the area to the right of the lower LCD 12.

The select button 14J, the home button 14K, and the start button 14L are provided in a lower area of the lower LCD 12. The buttons 14A through 14E, the select button 14J, the home button 14K, and the start button 14L are appropriately assigned functions, respectively, in accordance with the program executed by the game apparatus 10. The cross button 14A is used for, for example, a selection operation and a moving operation of a character during a game. The operation buttons 14B through 14E are used, for example, for a determination operation or a cancellation operation. The power button 14F can be used to power on/off the game apparatus 10. In another embodiment, the power button 14F can be used to indicate to the game apparatus 10 that it should enter a "sleep mode" for power saving purposes.

The analog stick 15 is a device for indicating a direction. The analog stick 15 is provided to an upper portion of the area to the left of the lower LCD 12 of the inner surface (main surface) of the lower housing 11. That is, the analog stick 15 is provided above the cross button 14A. The analog stick 15 is placed so as to be operated by the thumb of a left hand holding the lower housing 11. The provision of the analog stick 15 in the upper area places the analog stick 15 at the position where the thumb of the left hand of the user holding the lower housing 11 is naturally placed. The cross button 14A is placed at the position where the thumb of the left hand holding the lower housing 11 is moved slightly downward. This enables the user to operate the analog stick 15 and the cross button 14A by moving up and down the thumb of the left hand holding the lower housing 11. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

It should be noted that the four buttons, namely the button 14B, the button 14C, the button 14D, and the button 14E, and the analog stick 15 are placed symmetrically to each other with respect to the lower LCD 12. This also enables, for example, a left-handed person to provide a direction indication input using these four buttons, namely the button 14B, the button 14C, the button 14D, and the button 14E, depending on the game program.

The first LED 16A (FIG. 1) notifies the user of the on/off state of the power supply of the game apparatus 10. The first LED 16A is provided on the right of an end portion shared by the inner surface (main surface) of the lower housing 11 and the lower side surface of the lower housing 11. This enables the user to view whether or not the first LED 16A is lit on, regardless of the open/closed state of the game apparatus 10. The fourth LED 16D (FIG. 1) notifies the user that the game apparatus 10 is recharging and is located near the first LED 16A.

The microphone hole 18 is a hole for a microphone built into the game apparatus 10 as a sound input device. The built-in microphone detects a sound from outside the game apparatus 10 through the microphone hole 18. The microphone and the microphone hole 18 are provided below the power button 14F on the inner surface (main surface) of the lower housing 11.

The upper side surface of the lower housing 11 includes an opening 17 (a dashed line shown in FIGS. 1 and 3D) for a stylus 28. The opening 17 can accommodate the stylus 28 that is used to perform an operation on the touch panel 13. It should be noted that, normally, an input is provided to the touch panel 13 using the stylus 28. The touch panel 13, however, can be operated not only by the stylus 28 but also by a finger of the user.

The upper side surface of the lower housing 11 includes an insertion slot 11D (a dashed line shown in FIGS. 1 and 3D), into which an external memory 45 having a game program stored thereon is to be inserted. Within the insertion slot 11D, a connector (not shown) is provided for electrically connecting the game apparatus 10 and the external memory 45 in a detachable manner. The connection of the external memory 45 to the game apparatus 10 causes a processor included in internal circuitry to execute a predetermined game program. It should be noted that the connector and the insertion slot 11D may be provided on another side surface (e.g., the right side surface) of the lower housing 11.

The inner surface 21B of the upper housing 21 shown in FIG. 1 includes loudspeaker holes 21E, an upper LCD 22, an inner capturing section 24, a 3D adjustment switch 25, and a 3D indicator 26 are provided. The inner capturing section 24 is an example of a first capturing device.

The upper LCD 22 is a display device capable of displaying a stereoscopically visible image. The upper LCD 22 is capable of displaying a left-eye image and a right-eye image, using substantially the same display area. Specifically, the upper LCD 22 is a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the first embodiment, the upper LCD 22 is a parallax-barrier-type display device. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The upper LCD 22 is accommodated in the upper housing 21. A planar shape of the upper LCD 22 is a wider-than-high rectangle, and is placed at the center of the upper housing 21 such that the long side direction of the upper LCD 22 coincides with the long side direction of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12. The screen of the upper LCD 22 is provided on the inner surface (main surface) 21B of the upper housing 21, and is exposed through an opening of the inner surface of the upper housing 21. Further, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 800 dots×240 dots (horizontal×vertical). It should be noted that an LCD is used as the upper LCD 22 in the first embodiment. The upper LCD 22, however, is not limited to this, and a display device using EL or the like may be used. Furthermore, a display device having any resolution may be used as the upper LCD 22.

The loudspeaker holes 21E are holes through which sounds from loudspeakers 44 that serve as a sound output device of the game apparatus 10 are output. The loudspeakers holes 21E are placed symmetrically with respect to the upper LCD. Sounds from the loudspeakers 44 described later are output through the loudspeaker holes 21E.

The inner capturing section 24 functions as a capturing section having an imaging direction that is the same as the inward normal direction of the inner surface 21B of the upper housing 21. The inner capturing section 24 includes an imaging device having a predetermined resolution, and a lens. The lens may have a zoom mechanism.

The inner capturing section 24 is placed: on the inner surface 21B of the upper housing 21; above the upper edge of the screen of the upper LCD 22; and in the center of the upper housing 21 in the left-right direction (on the line dividing the upper housing 21 (the screen of the upper LCD 22) into two equal left and right portions). Such a placement of the inner capturing section 24 makes it possible that when the user views the upper LCD 22 from the front thereof, the inner capturing section 24 captures the user's face from the front thereof. A left outer capturing section 23a and a right outer capturing section 23b will be described later.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. The 3D adjustment switch 25 is provided at an end portion shared by the inner surface and the right side surface of the upper housing 21, so as to be visible to the user, regardless of the open/closed state of the game apparatus 10. The 3D adjustment switch 25 includes a slider that is slidable to any position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. The 3D indicator 26 is placed on the inner surface 21B of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even when viewing the screen of the upper LCD 22.

FIG. 2 is a right side view showing an example of the game apparatus 10 in the open state. The right side surface of the lower housing 11 includes a second LED 16B, a wireless switch 19, and the R button 14H. The second LED 16B notifies the user of the establishment state of the wireless communication of the game apparatus 10. The game apparatus 10 is capable of wirelessly communicating with other devices, and the second LED 16B is lit on when wireless communication is established between the game apparatus 10 and other devices. The game apparatus 10 has the function of establishing connection with a wireless LAN by, for example, a method based on the IEEE 802.11.b/g standard. The wireless switch 19 enables/disables the function of the wireless communication. The R button 14H will be described later.

FIG. 3A is a left side view showing an example of the game apparatus 10 being closed (in the closed state). The left side surface of the lower housing 11 shown in FIG. 3A includes an openable and closable cover section 11C, the L button 14H, and the sound volume button 14I. The sound volume button 14I is used to adjust the sound volume of the loudspeakers of the game apparatus 10.

Within the cover section 11C, a connector (not shown) is provided for electrically connecting the game apparatus 10 and a data storage external memory 46 (see FIG. 1). The data storage external memory 46 is detachably attached to the connector. The data storage external memory 46 is used to, for example, store (save) data of an image captured by the game apparatus 10. It should be noted that the connector and the cover section 11C may be provided on the right side surface of the lower housing 11. The L button 14G will be described later.

FIG. 3B is a front view showing an example of the game apparatus 10 in the closed state. The outer surface of the upper housing 21 shown in FIG. 3B includes a left outer capturing section 23a, a right outer capturing section 23b, and a third LED 16C.

The left outer capturing section 23a and the right outer capturing section 23b each includes an imaging device (e.g., a CCD image sensor or a CMOS image sensor) having a predetermined common resolution, and a lens. The lens may have a zoom mechanism. The imaging directions of the left outer capturing section 23a and the right outer capturing section 23b (the optical axis of the camera) are each the same as the outward normal direction of the outer surface 21D. That is, the imaging direction of the left outer capturing section 23a and the imaging direction of the right outer capturing section 23b are parallel to each other. Hereinafter, the left outer capturing section 23a and the right outer capturing section 23b are collectively referred to as an "outer capturing section 23". The outer capturing section 23 is an example of a second capturing device.

The left outer capturing section 23a and the right outer capturing section 23b included in the outer capturing section 23 are placed along the horizontal direction of the screen of the upper LCD 22. That is, the left outer capturing section 23a and the right outer capturing section 23b are placed such that a straight line connecting between the left outer capturing section 23a and the right outer capturing section 23b is placed along the horizontal direction of the screen of the upper LCD 22. When the user has pivoted the upper housing 21 at a predetermined angle (e.g., 90°) relative to the lower housing 11, and views the screen of the upper LCD 22 from the front thereof, the left outer capturing section 23a is placed on the left side of the user viewing the screen, and the right outer capturing section 23b is placed on the right side of the user (see FIG. 1). The distance between the left outer capturing section 23a and the right outer capturing section 23b is set to correspond to the distance between both eyes of a person, and may be set, for example, in the range from 30 mm to 70 mm. It should be noted, however, that the distance between the left outer capturing section 23a and the right outer capturing section 23b is not limited to this range. It should be noted that in the first embodiment, the left outer capturing section 23a and the right outer capturing section 23b are fixed to the housing 21, and therefore, the imaging directions cannot be changed.

The left outer capturing section 23a and the right outer capturing section 23b are placed symmetrically with respect to the line dividing the upper LCD 22 (the upper housing 21) into two equal left and right portions. Further, the left outer capturing section 23a and the right outer capturing section 23b are placed in the upper portion of the upper housing 21 and in the back of the portion above the upper edge of the screen of the upper LCD 22, in the state where the upper housing 21 is in the open state (see FIG. 1). That is, the left outer capturing section 23a and the right outer capturing section 23b are placed on the outer surface of the upper housing 21, and, if the upper LCD 22 is projected onto the outer surface of the upper housing 21, is placed above the upper edge of the screen of the projected upper LCD 22.

Thus, the left outer capturing section 23a and the right outer capturing section 23b of the outer capturing section 23 are placed symmetrically with respect to the center line of the upper LCD 22 extending in the transverse direction. This makes it possible that when the user views the upper LCD 22 from the front thereof, the imaging directions of the outer capturing section 23 coincide with the directions of the respective lines of sight of the user's right and left eyes. Further, the outer capturing section 23 is placed in the back of the portion above the upper edge of the screen of the upper LCD 22, and therefore, the outer capturing section 23 and the upper LCD 22 do not interfere with each other inside the upper housing 21. Further, when the inner capturing section 24 provided on the inner surface of the upper housing 21 as shown by a dashed line in FIG. 3B is projected onto the outer surface of the upper housing 21, the left outer capturing section 23a and the right outer capturing section 23b are placed symmetrically with respect to the projected inner capturing section 24. This makes it possible to reduce the upper housing 21 in thickness as compared to the case where the outer capturing section 23 is placed in the back of the screen of the upper LCD 22, or the case where the outer capturing section 23 is placed in the back of the inner capturing section 24.

The left outer capturing section 23a and the right outer capturing section 23b can be used as a stereo camera, depending on the program executed by the game apparatus 10. Alternatively, either one of the two outer capturing sections (the left outer capturing section 23a and the right outer capturing section 23b) may be used solely, so that the outer capturing section 23 can also be used as a non-stereo camera, depending on the program. When a program is executed for causing the left outer capturing section 23a and the right outer capturing section 23b to function as a stereo camera, the left outer capturing section 23a captures a left-eye image, which is to be viewed with the user's left eye, and the right outer capturing section 23b captures a right-eye image, which is to be viewed with the user's right eye. Yet alternatively, depending on the program, images captured by the two outer capturing sections (the left outer capturing section 23a and the right outer capturing section 23b) may be combined together, or may be used to compensate for each other, so that imaging can be performed with an extended imaging range. Yet alternatively, a left-eye image and a right-eye image that have a parallax may be generated from a single image captured using one of the outer capturing sections 23a and 23b, and a pseudo-stereo image as if captured by two cameras can be generated. To generate the pseudo-stereo image, it is possible to appropriately set the distance between virtual cameras.

The third LED 16C is lit on when the outer capturing section 23 is operating, and informs that the outer capturing section 23 is operating. The third LED 16C is provided near the outer capturing section 23 on the outer surface of the upper housing 21.

FIG. 3C is a right side view showing an example of the game apparatus 10 in the closed state. FIG. 3D is a rear view showing an example of the game apparatus 10 in the closed state.

The L button 14G and the R button 14H are provided on the upper side surface of the lower housing 11 shown in FIG. 3D. The L button 14G is provided at the left end portion of the upper side surface of the lower housing 11, and the R button 14H is provided at the right end portion of the upper side surface of the lower housing 11. The L button 14G and the R button 14H are appropriately assigned functions, respectively, in accordance with the program executed by the game apparatus 10. For example, the L button 14G and the R button 14H function as shutter buttons (capturing instruction buttons) of the capturing sections described above.

It should be noted that although not shown in the figures, a rechargeable battery that serves as the power supply of the game apparatus 10 is accommodated in the lower housing 11, and the battery can be charged through a terminal provided on the side surface (e.g., the upper side surface) of the lower housing 11.

Figure 4:
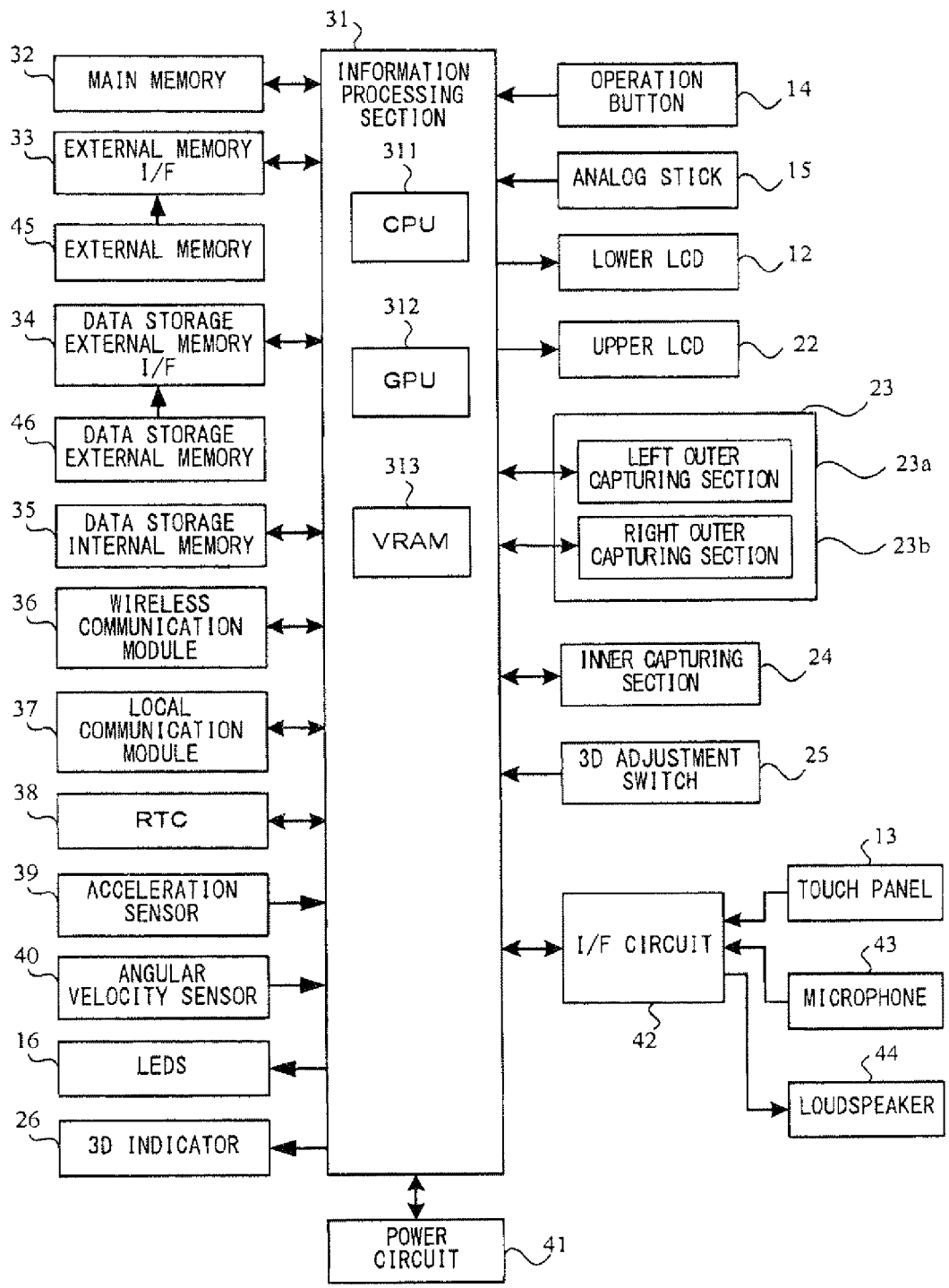
FIG. 4 is a block diagram showing an example of the internal configuration of the game apparatus 10.

FIG. 4 is a block diagram showing an example of the internal configuration of the game apparatus 10. The game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11, or may be accommodated in the upper housing 21.

The information processing section 31 is information processing means including a central processing unit (CPU) 311 that executes a predetermined program, a graphics processing unit (GPU) 312 that performs image processing, and the like. In the first embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs the image processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 45, another device, or the like) the game apparatus 10. In the first embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed. The data storage external memory 46 is composed of a readable/writable non-volatile memory (e.g., a NAND flash memory), and is used to store predetermined data. For example, the data storage external memory 46 stores images captured by the outer capturing section 23 and/or images captured by another device. When the data storage external memory 46 is connected to the data storage external memory I/F 34, the information processing section 31 loads an image stored in the data storage external memory 46, and the image can be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 can detect the magnitudes of accelerations (linear accelerations) in the directions of straight lines along three axial (x, y, and z axes in the present embodiment) directions, respectively. The acceleration sensor 39 is provided, for example, within the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40, such as a gyroscope sensor, is connected to the information processing section 31. The angular velocity sensor 40 detects angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) based on the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects a sound from the user, and outputs a sound signal to the I/F circuit 42. The amplifier amplifies the sound signal from the I/F circuit 42, and outputs the sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal to sound data in a predetermined format. The touch panel control circuit generates touch position data in a predetermined format, based on a signal from the touch panel 13, and outputs the touch position data to the information processing section 31. The touch position data indicates the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the first embodiment, the information processing section 31 causes the lower LCD 12 to display an image for a hand-drawn image input operation, and causes the upper LCD 22 to display an image acquired from either one of the outer capturing section 23 and the inner capturing section 24. That is, for example, the information processing section 31 causes the upper LCD 22 to display a stereoscopic image (stereoscopically visible image) using a right-eye image and a left-eye image that are captured by the inner capturing section 24, or causes the upper LCD 22 to display a planar image using one of a right-eye image and a left-eye image that are captured by the outer capturing section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer capturing section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 are connected to the information processing section 31. The outer capturing section 23 and the inner capturing section 24 each capture an image in accordance with an instruction from the information processing section 31, and output data of the captured image to the information processing section 31. In the first embodiment, the information processing section 31 gives either one of the outer capturing section 23 and the inner capturing section 24 an instruction to capture an image, and the capturing section that has received the instruction captures an image, and transmits data of the captured image to the information processing section 31. Specifically, the user selects the capturing section to be used, through an operation using the touch panel 13 and the operation button 14. The information processing section 31 (the CPU 311) detects that an capturing section has been selected, and the information processing section 31 gives the selected one of the outer capturing section 23 and the inner capturing section 24 an instruction to capture an image.

When started by an instruction from the information processing section 31 (CPU 311), the outer capturing section 23 and the inner capturing section 24 perform capturing at, for example, a speed of 60 images per second. The captured images captured by the outer capturing section 23 and the inner capturing section 24 are sequentially transmitted to the information processing section 31, and displayed on the upper LCD 22 or the lower LCD 12 by the information processing section 31 (GPU 312). When output to the information processing section 31, the captured images are stored in the VRAM 313, are output to the upper LCD 22 or the lower LCD 12, and are deleted at predetermined times. Thus, images are captured at, for example, a speed of 60 images per second, and the captured images are displayed, whereby the game apparatus 10 can display views in the imaging ranges of the outer capturing section 23 and the inner capturing section 24, on the upper LCD 22 of the lower LCD 12 in real time.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

Figure 5:
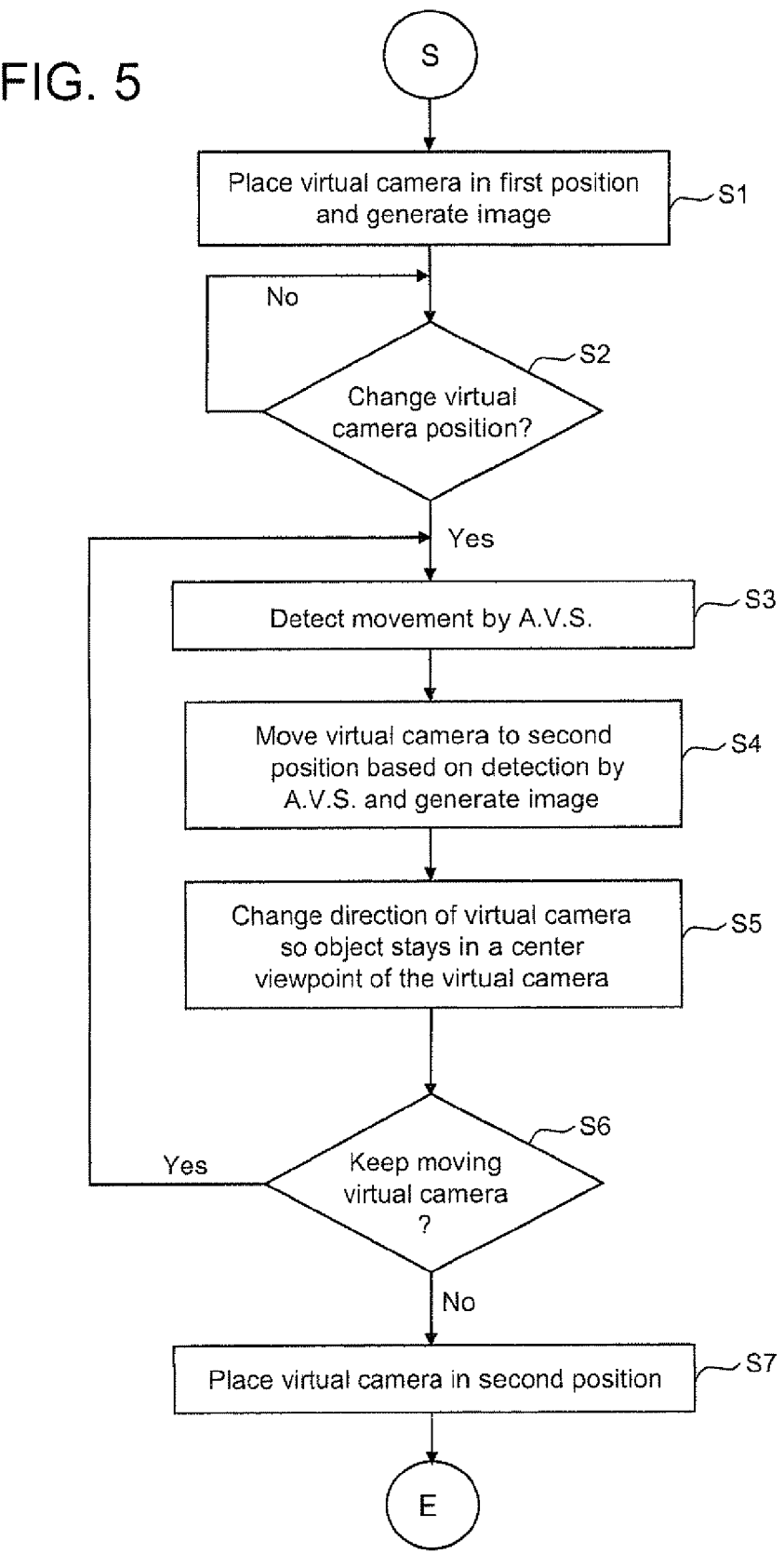
FIG. 5 is an exemplary application flowchart depicting an application process for the present system.

FIG. 5 shows an example of an application flowchart for the virtual camera auto-centering system. The system begins in S1 where the virtual camera is placed in a first position and having a first viewing direction (i.e. viewing angle or orientation). This position can be a default position for game play. For example, the virtual camera may have a default view for viewing a player character in the third person as the player character moves positions on the display of the game apparatus 10.

After positioning the virtual camera in the first position, the system proceeds to step S2 where it determines if it is necessary to change the virtual camera position and angle. Although not limited to this embodiment, the system determines if it is necessary to move the virtual camera based upon a particular change in game state or based upon an input by the player. For example, the player character may begin interacting with another object on the screen which would then trigger the system to enter a "free viewing" state where the user could move the virtual camera by, for example, moving or tilting the game apparatus 10. In another example, the user may be able to press a button or press the cross-switch, thereby triggering the system to also enter the "free viewing" state.

Once the system determines that it has entered the "free viewing" state, the system proceeds to S3 where it processes measured outputs from the motion control devices. In an exemplary embodiment, the system will measure the angular rate of rotational movement from a gyroscope sensor (an exemplary angular velocity sensor) in the game apparatus 10. In another embodiment, the system can measure the outputs from one or more accelerometers. When measuring the angular rate of rotational movement, the system moves the virtual camera based on the angular rate of rotational movement, as described further below.

In step S3, a rate of rotational movement of the game apparatus 10 is detected by an angular velocity sensor 40, such as a gyroscope included in the game apparatus 10. The angular velocity sensor 40 can measure the angular rate of rotation of the game apparatus 10 (i.e. the angular velocity). The system can also use these measurements to determine the change in angular orientation (i.e. the angular position) of the game apparatus 10. For example, by knowing the angular rate of rotation (i.e. the angular velocity), the system can also determine the change in angular position by performing mathematical calculations. Therefore, the system can determine the orientation of the game apparatus 10 by using either the detected angular rate of rotation or the calculated change in angular position.

After measuring the output from the motion control device, the system proceeds to S4 where it begins moving the position and direction (i.e. viewing angle or orientation) of the virtual camera. In an exemplary embodiment, the virtual camera will move with a linear correspondence to an angular rate of rotational movement detected by a gyroscope sensor in the system. For example, if the game apparatus 10 is tilted upward so that the upper housing 21B is moving towards the player, the virtual camera will move to a position downward, and the direction of viewing of the virtual camera will point upwards. In other words, the virtual camera will move to a new position below the "eye level" view of the player character and will point upwards (i.e., will have a direction pointing upwards) as to view the player character from a "bottom" view.

As the system begins moving the virtual camera in S4 the system proceeds to S5 where it simultaneously changes the view of the virtual camera so that the player character is in a substantially center position of the field-of-view of the virtual camera. That is, the first object remains in the center of the display of the virtual camera as the virtual camera moves around the player character. In a sense, the virtual camera will be moving about the player character. As such, the player character will remain at substantially the center of the viewpoint of the virtual camera as the virtual camera changes position and viewing direction.

A displayed image generated with the virtual camera placed at the first position and having the first viewing direction in step S1 may thus include a player character at its center. Subsequently displayed images are generated as the virtual camera is changed from the first position and first viewing direction as a result of the angular velocity of the game apparatus 10 as measured by the angular velocity sensors. However, even as the position and viewing direction of the virtual camera is changed, the player character remains at the same location (i.e., the image center) in the subsequently displayed images due to the auto-correction described herein.

As the virtual camera is moving to the second position while keeping the player character in the center of the viewpoint of the virtual camera (and hence while keeping the player character in the center of the animated images), the system proceeds to S6 where it determines if the virtual camera needs to keep moving. For example, the player may continue to move or tilt the game apparatus 10 thereby requiring the virtual camera to continue moving. If the system determines that the virtual camera needs to keep moving, the system reverts back to S3 where it repeats S3 through S6 until the system determines that the virtual camera no longer needs to keep moving.

Once the system determines that the virtual camera no longer needs to keep moving, the system proceeds to S7 where the virtual camera is positioned in a second position. For example, the user may stop moving or tilting the apparatus (i.e. the angular velocity is now '0') or the game state may change where the virtual camera may no longer be in the "free viewing mode." The virtual camera will remain in the second position until the player begins moving the game apparatus 10 again while in the free viewing mode. It should be appreciated, that if the player is no longer in the "free viewing" mode, the system can return the virtual camera to a default state or change the position and angle of the virtual camera as necessary.

Figure 6:
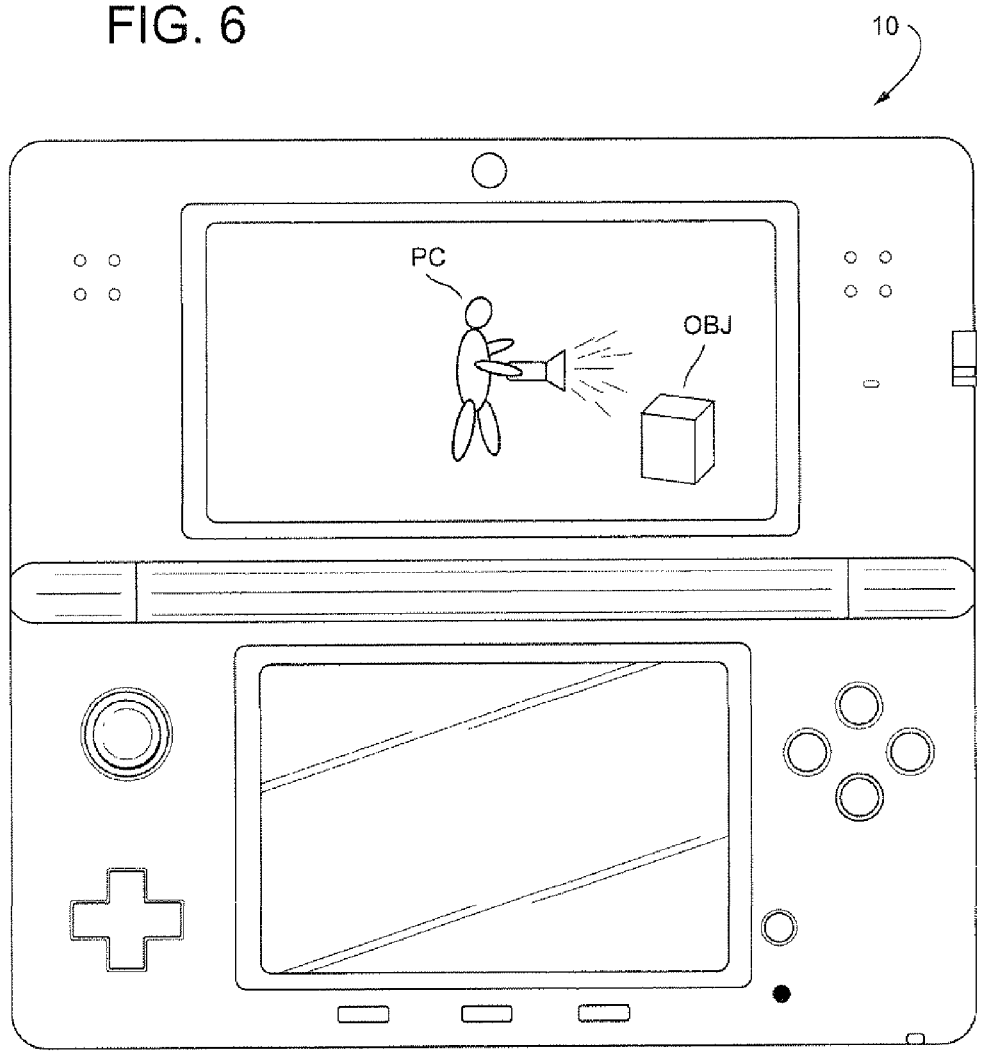
FIG. 6 is an exemplary diagram showing an example of the game apparatus 10 being held in a first position.

FIG. 6 shows a diagram of an example embodiment where the game apparatus 10 is held in a first position. In this example, the player character PC is standing to the right and the virtual camera is "level" with the player character. This example shows the player character PC shining a flashlight on an object OBJ. As can be seen in FIG. 6, the object OBJ in this example is a box. It should be appreciated that the virtual camera, in this example, is positioned "level" with the player character and moves based on the change in angular position of the game apparatus 10. In other words, even though the game apparatus 10 may not be "level" (i.e. may be slightly tilted), the virtual camera does not reposition itself based on the game apparatus 10 current orientation, but on the angular rate of rotational movement as determined by the angular velocity sensor 40.

In this example, the player character PC is about to interact with the object OBJ. Although not limited to this embodiment, once the player character PC interacts with the object OBJ, the system begins to move the virtual camera VC based on the angular rate of rotational movement of the game apparatus 10 as determined by the angular velocity sensor 40.

FIG. 7 shows a diagram of an example where the game apparatus 10 is moved while the player character PC is interacting with the object OBJ. In this example, the game apparatus 10 is moved from a "level," or "center" position to an "upward and right" position. For example, the upper housing 21B will move out and away from the viewer and the right portion of the upper housing 21B will also move out and away from the viewer.

As explained above, the game apparatus 10 contains angular velocity sensors 40 that measure the angular velocity of movement of the game apparatus 10. The game apparatus 10 changes the position of the virtual camera VC based on the change in angular velocity of the moved game apparatus 10 as measured by the angular velocity sensors 40. In this example, the angular velocity sensors 40 detect a change in the game apparatus 10 as it moves in the upward and right directions. The angular velocity sensors 40 in this example will detect the change in the sensors in the "left" and "downward" directions. Thus, in this example, the position of the virtual camera will offset upwards and to the right of the player character PC. In order to keep the player character PC in a center view of the virtual camera VC, the virtual camera VC will offset its view down and to the left (i.e., the viewing direction changes). This way, the viewing position and direction of the virtual camera VC change simultaneously and automatically while keeping the player character PC substantially in the center of field-of-view of the virtual camera VC.

As can be seen by way of example in FIG. 7, as the virtual camera VC moves to the second position, the player character PC remains in a third-person view in the center of the viewpoint of the virtual camera VC. That is, as the virtual camera VC moves, the player character PC always remains in the center of the viewpoint of the virtual camera VC so that the virtual camera VC moves "about" the player character PC. In other words, the player character PC can be viewed as being at the center of an invisible "X-Y-Z" axis and the virtual camera VC moves about the player character in the 3-D "X-Y-Z" virtual space. This allows the game apparatus to keep the player character PC in a center viewpoint of the virtual camera VC while viewing the player character PC in a third-person view. The player character PC thus remains substantially in the center of the displayed images, even as the virtual camera VC moves based upon the measured angular velocity of the game apparatus 10.

It should be appreciated that the position and direction of the virtual camera may change in a direction opposite that of which the game apparatus is moving. For example, if the game apparatus 10 is tilted in the "upward" and "right" directions as explained above, the virtual camera VC may offset its view up and to the right, while moving its position downwards and to the left. This way, the virtual camera may move in a direction opposite to that in which the game apparatus 10 is being moved or tilted.

Figure 8A:
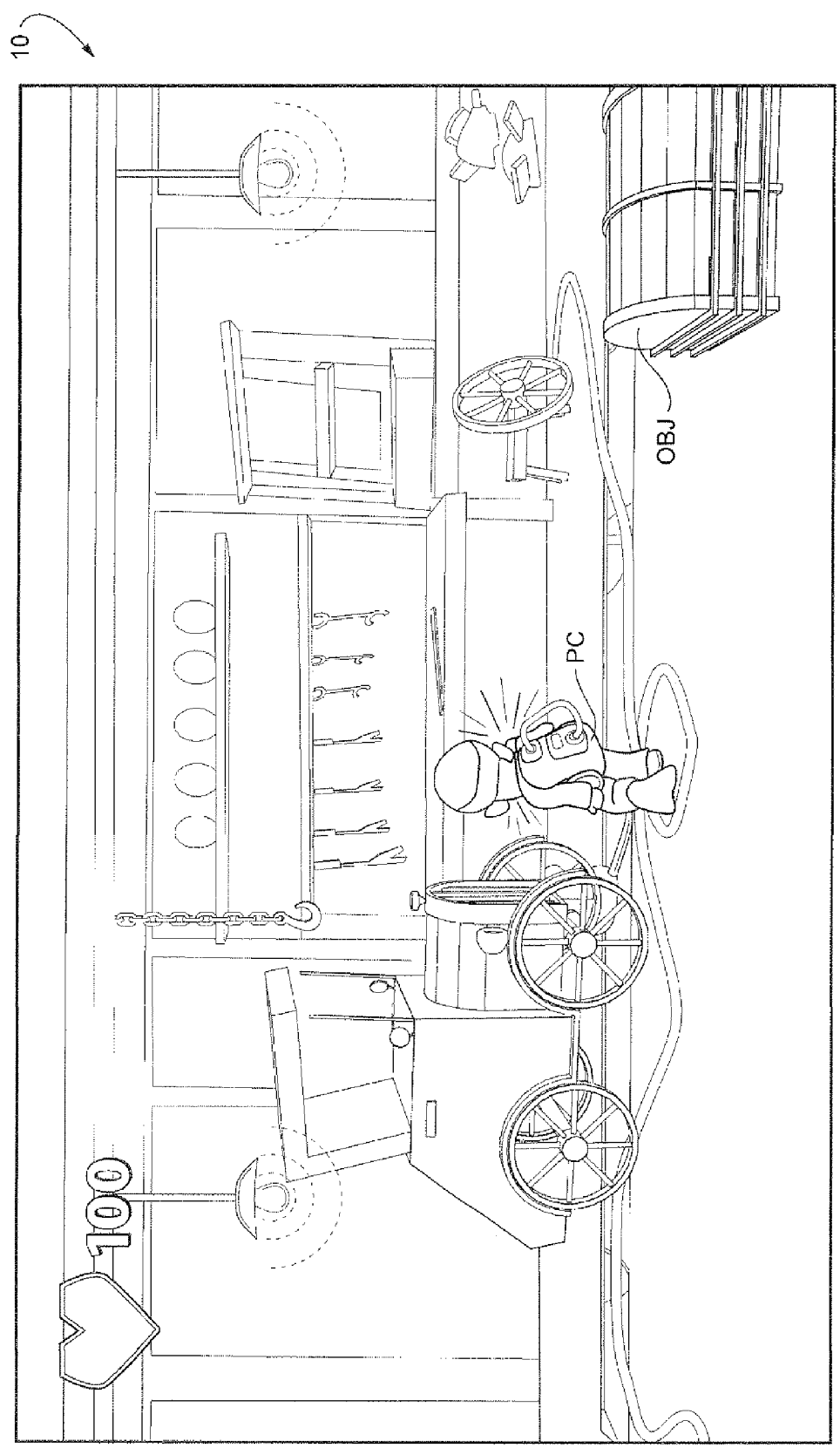
FIG. 8A is an example showing a situation where the virtual camera is positioned in a first location.
Figure 8B:
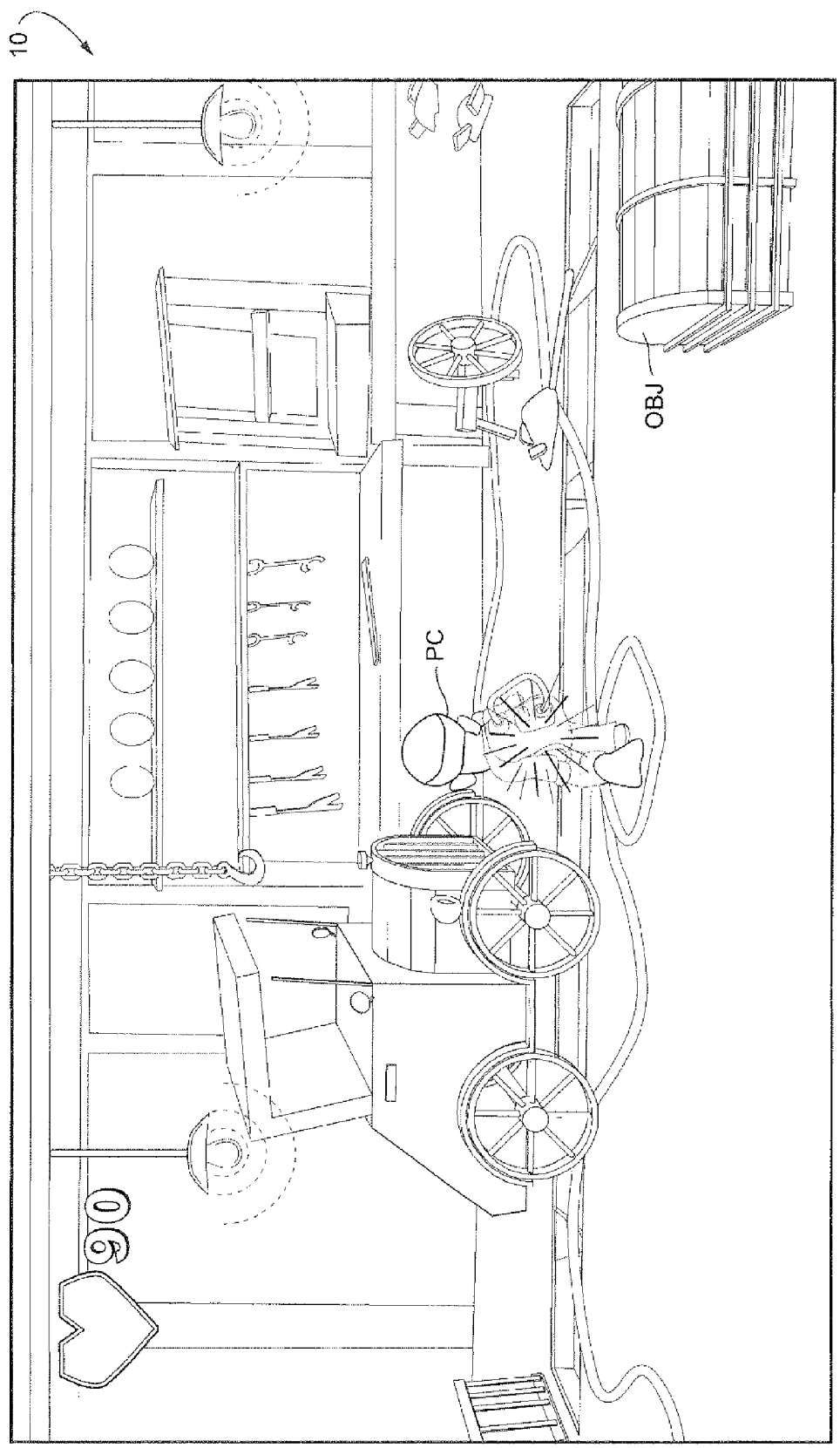
FIG. 8B is an example where the virtual camera moves in a direction to a second location.
Figure 8C:
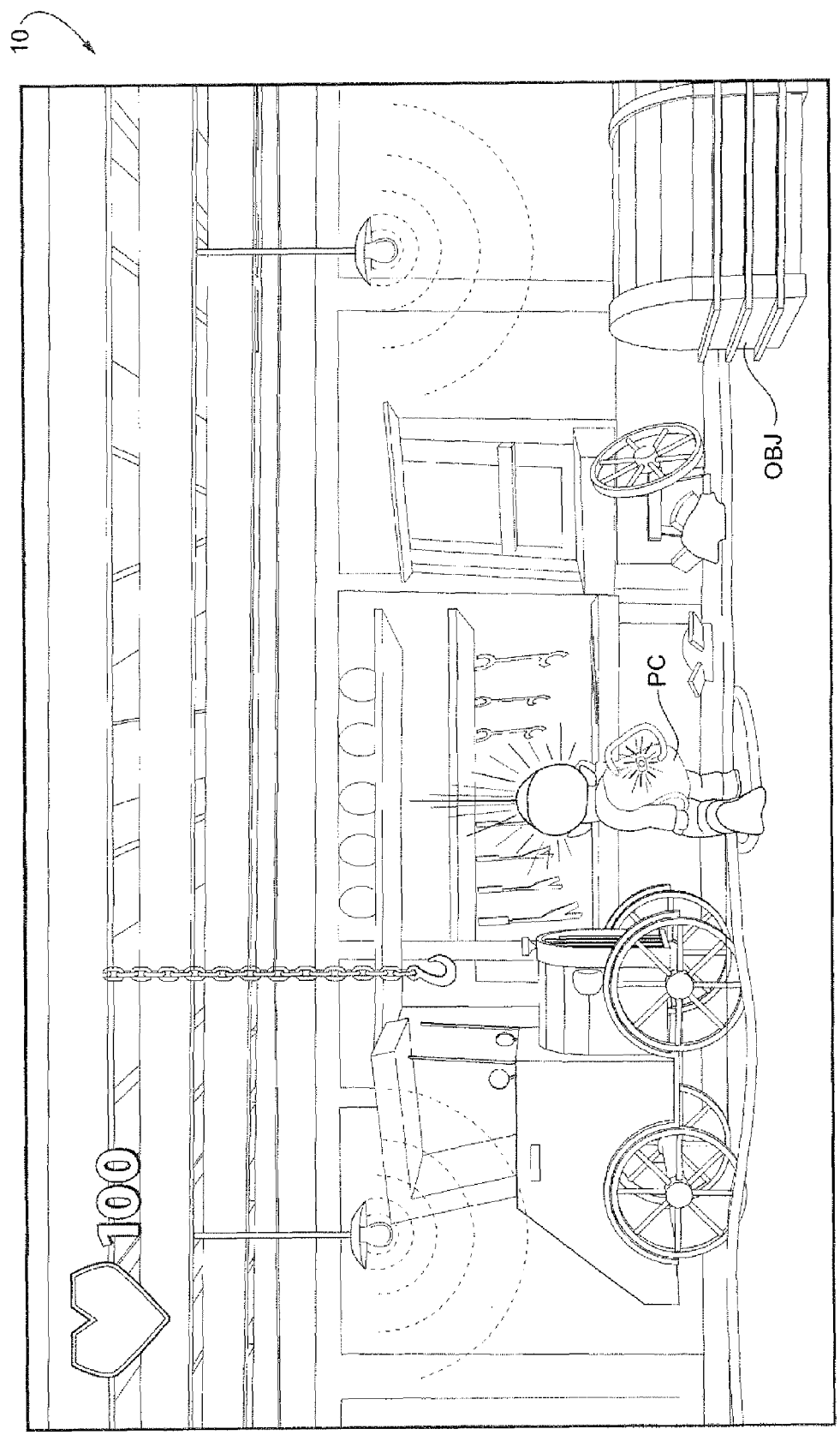
FIG. 8C is an example where the virtual camera moves in a direction to another second location.

FIGS. 8A-C show examples of an embodiment of the present system. FIG. 8A shows the state where the virtual camera is in the "default" or first position. As can be seen in FIG. 8A, the virtual camera is "level" with the player character.

FIG. 8B shows an example where the game apparatus 10 can be moved to be tilted "up." This movement is measured by the angular velocity sensor 40. In other words, the upper housing 21B of the game apparatus 10 moves away from the player. As can be seen in FIG. 8B, the virtual camera moves in an upward direction, and keeps the player character in the central viewpoint of the virtual camera so as to move about the player character. More specifically, in FIG. 8B, the virtual camera moves to a position "up" and above the virtual camera's initial position while moving the viewing angle of the virtual camera downwards so that the player character will remain substantially in the center of the viewpoint of the virtual camera.

Similarly, FIG. 8C shows a case where the game apparatus 10 can be moved to be tilted "down" and the virtual camera moves downward while keeping the player character in the center field-of-view of the virtual camera. This movement is measured by the angular velocity sensor 40. In this example, the upper housing 21B of the game apparatus 10 moves towards the player. In FIG. 8C, the virtual camera moves to a position "down" and below the virtual camera's initial position while moving the viewing angle, or viewing direction of the virtual camera upward so that the player character will remain substantially in the center of the viewpoint of the virtual camera. In other words, the examples shown in FIGS. 8A-C illustrate the player character PC remaining in substantially the same location (e.g., the center of the respective screens) even as the virtual camera moves as detected by the angular velocity sensor 40.

Figure 9A:
FIG. 9A is another example where the virtual camera is positioned in another first location.
Figure 9B:
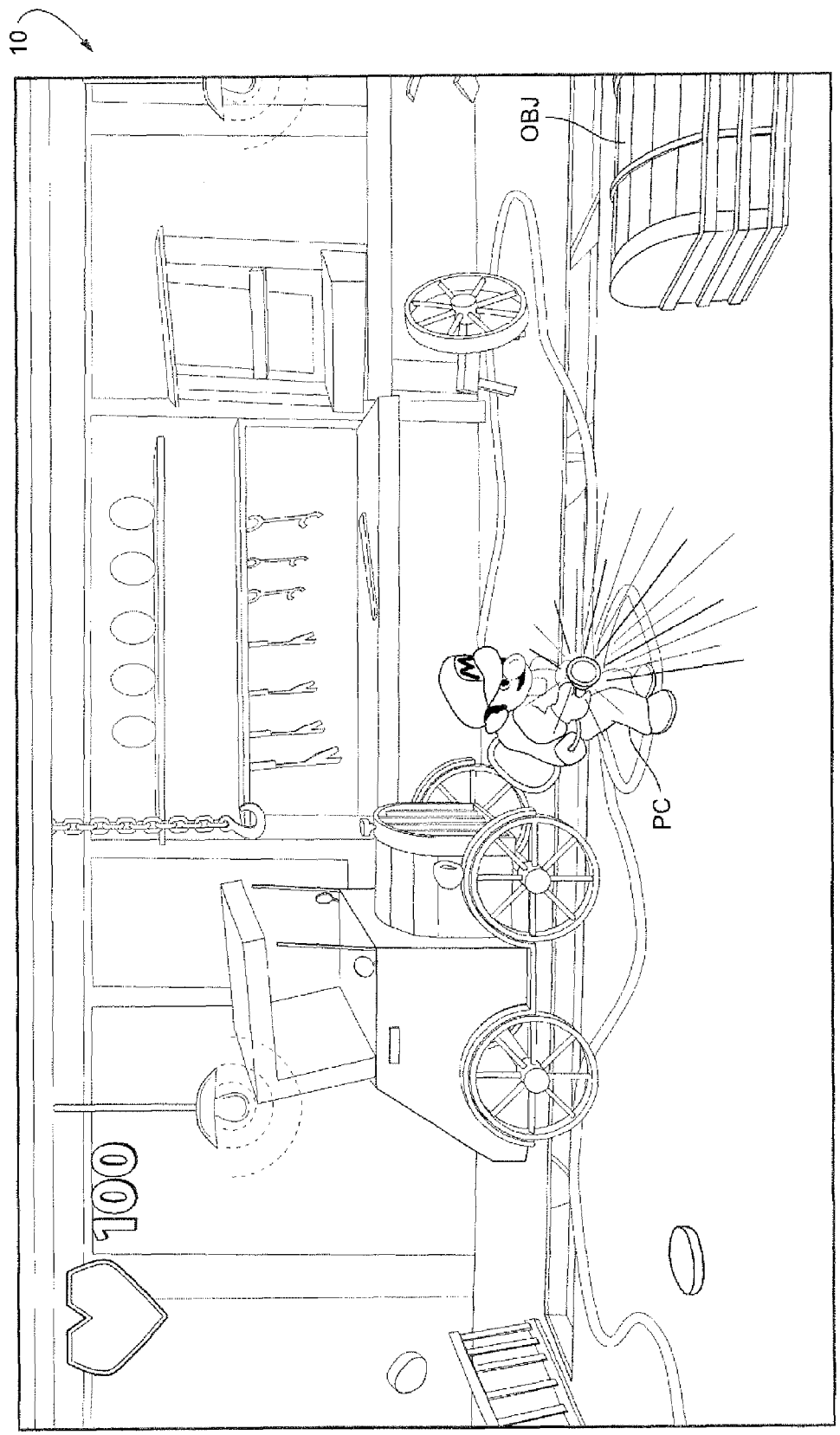
FIG. 9B is another example where the virtual camera moves in a direction to another second location.
Figure 9C:
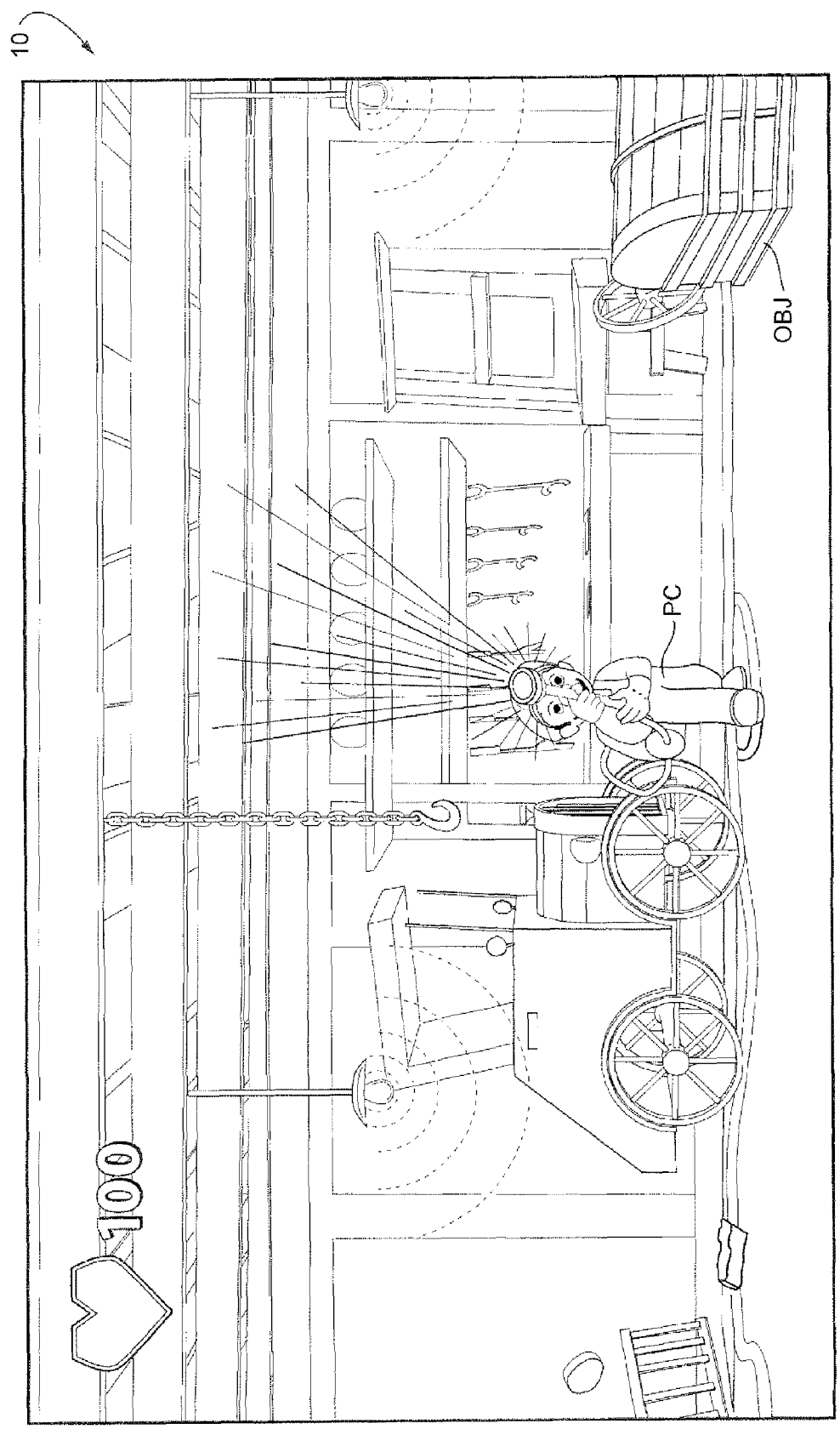
FIG. 9C is another example where the virtual camera moves in a direction to another second location.

FIGS. 9A-C show another set of examples of an embodiment of the present system. FIG. 9A shows another "default" state for the virtual camera where the camera is essentially "level" with the player character. In FIG. 9A, the player character is turned so as to view the side of the player character in the third-person view.

FIG. 9B shows an example where the game apparatus 10 is moved up and to the right. This movement is measured by the angular velocity sensor 40. As can be seen in FIG. 9B, the virtual camera moves to an upward and right position while keeping the player character in the central viewpoint of the virtual camera. In this example, the upper housing 21B moves away from the user while the right portion of the upper housing 21B also moves away from the user, and the left portion of the upper housing 21B moves toward the user. In this example, the virtual camera position moves "up" and above the player character and is offset to the "right" of the player character. The viewing direction of the virtual camera is correspondingly turned "down" and to the "left" so as to keep the player character in the center of the field-of-view of the virtual camera.

Likewise, FIG. 9C shows an example where the game apparatus 10 is tilted down and to the right. This movement is measured by the angular velocity sensor 40. That is, the upper housing 21B comes toward the user while the right portion of the upper housing 21B moves away from the user. The virtual camera consequently moves down and to the right while keeping the player character in the central viewpoint of the virtual camera. In this example, the virtual camera position moves "down" and below the player character and is offset to the "right" of the player character. The viewing direction of the virtual camera is correspondingly turned "up" and to the "left" so as to keep the player character in the center of the field-of-view of the virtual camera. In other words, the examples in FIGS. 9A-C illustrate the player character PC remaining in substantially the same location (e.g., the center of the respective screens) even as the virtual camera moves as detected by the angular velocity sensor 40.

While the system has been described above as using a single virtual camera, the same system can be implemented in a system using two or more virtual cameras. For example, the system can be implemented in a 3-D viewing system that uses at least two virtual cameras.

While the system has been described in connection with what is presently considered to be the most practical and preferred embodiment, it is to be understood that the system is not to be limited to the disclosed embodiment, but on the contrary, is intended to cover various modifications and equivalent arrangements included within the spirit and scope of the claims.

What is claimed is:

1. A method of controlling a virtual camera based on a detected posture of an electronic device, comprising:
   positioning the virtual camera at a first position with the virtual camera viewing a first object at a first direction;
   moving the virtual camera to a second position in correspondence with a direction related to a detected change in the posture of the electronic device detected using at least a measurement from an angular velocity sensor; and
   moving the virtual camera to a second direction so as to keep the first object in a predetermined position of a viewing direction of the virtual camera while the virtual camera moves from the first position to the second position,
   the virtual camera is controlled directly according to the detected change in the posture of the electronic device.

2. The method of claim 1, wherein the virtual camera moves in a direction about the first object based on the measurement by the angular velocity sensor so as to keep the first object in the predetermined position of the viewing direction of the virtual camera.

3. The method of claim 1, wherein the virtual camera moves positions when the first object interacts with a second object.

4. The method of claim 1, wherein the virtual camera moves in a same direction of angular rotation determined based on measurements obtained by the angular velocity sensor.

5. The method of claim 1, wherein the virtual camera moves in an opposite direction of angular rotation determined based on measurements obtained by the angular velocity sensor.

6. The method of claim 1, wherein the first object is a player character and the virtual camera views the player character in a third-person view.

7. The method of claim 1, wherein the predetermined position is a substantially center position of the viewing direction of the virtual camera.

8. A non-transitory computer readable storage medium having computer readable code embodied therein for controlling a virtual camera based on a detected posture of an electronic device, wherein the code upon execution by a computer performs functionality comprising:
   positioning the virtual camera at a first position with the virtual camera viewing a first object at a first direction;
   moving the virtual camera to a second position in correspondence with a direction related to a change in the posture of the electronic device detected using at least a measurement from an angular velocity sensor; and
   moving the virtual camera to a second direction so as to keep the first object in a predetermined position of a viewing direction of the virtual camera while the virtual camera moves from the first position to the second position,
   the virtual camera is controlled directly according to the detected change in the posture of the electronic device.

9. The non-transitory computer readable storage medium of claim 8, wherein the virtual camera moves in a direction about the first object based on the measurement by the angular velocity sensor so as to keep the first object in the predetermined position of the viewing direction of the virtual camera.

10. The non-transitory computer readable storage medium of claim 8, wherein the virtual camera moves positions when the first object interacts with a second object.

11. The non-transitory computer readable storage medium of claim 8, wherein the virtual camera moves in a same direction of angular rotation determined based on measurements obtained by the angular velocity sensor.

12. The non-transitory computer readable storage medium of claim 8, wherein the virtual camera moves in an opposite direction of angular rotation determined based on measurements obtained by the angular velocity sensor.

13. The non-transitory computer readable storage medium of claim 8, wherein the first object is a player character and the virtual camera views the player character in a third-person view.

14. The non-transitory computer readable storage medium of claim 8, wherein the predetermined position is a substantially center position of the viewing direction of the virtual camera.

15. A gaming apparatus comprising:
an angular velocity sensor configured to detect a posture of the gaming apparatus; and
at least one processor configured to control a virtual camera based on the detected posture of the gaming apparatus and configured to:
position the virtual camera at a first position with the virtual camera viewing a first object at a first direction;
move the virtual camera to a second position in correspondence with a direction related to a change in the posture of the gaming apparatus detected using at least a measurement from the angular velocity sensor; and
move the virtual camera to a second direction so as to keep the first object in a predetermined position of a viewing direction of the virtual camera while the virtual camera moves from the first position to the second position,
the virtual camera is controlled directly according to the detected change in the posture of the electronic device.

16. The gaming apparatus of claim 15, wherein the at least one processor is configured to move the virtual camera in a direction about the first object based on the measurement by the angular velocity sensor so as to keep the first object in the predetermined position of the viewing direction of the virtual camera.

17. The gaming apparatus of claim 15, where the at least one processor is configured to move the position of the virtual camera when the first object interacts with a second object.

18. The gaming apparatus of claim 15, wherein the virtual camera moves in a same direction of angular rotation determined based on measurements obtained by the angular velocity sensor.

19. The gaming apparatus of claim 15, wherein the virtual camera moves in an opposite direction of angular rotation determined based on measurements obtained by the angular velocity sensor.

20. The gaming apparatus of claim 15, wherein the first object is a player character and the virtual camera views the player character in a third-person view.

21. The gaming apparatus of claim 15, wherein the predetermined position is a substantially center position of the viewing direction of the virtual camera.

22. A method comprising:
generating, using computer at least one processor, a first image of a virtual object in a field of view of a virtual camera having an initial orientation and an initial position in a virtual world;
detecting a movement of a device using at least a measurement from an angular velocity sensor;
changing orientation of the virtual camera from the initial orientation based on the detected movement; and
changing position of the virtual camera from the initial position and corresponding to a direction related to the detected movement, the position of the virtual camera being changed simultaneously with the orientation of the virtual camera being changed so that a location of the virtual object in at least a second generated image remains at a same location as in the first image and the virtual camera is controlled directly according to the detected movement of the electronic device.

23. The method of claim 22, wherein the same location of the virtual object in the first and second images is at the center of each of the respective images and the angular velocity sensor is a gyro sensor.

24. A system comprising:
a gyro sensor configured to output data in response to movement of a hand-held device;
a processing system having at least one processor, the processing system configured to:
generate a first image of a virtual object in a field of view of a virtual camera having an initial orientation and an initial position;
change the orientation of the virtual camera from the initial orientation using at least a measurement from the gyro sensor;
change, corresponding to a direction related to the measurement from the gyro sensor, the position of the virtual camera from the initial position simultaneously with the orientation of the virtual camera being changed, the virtual camera being controlled directly according to the measurement from the gyro sensor; and
generate at least a second image of the virtual object in a field of view of the virtual camera having the changed orientation and the changed position so that a location of the virtual object in the second image remains at a same location as in the first image.

25. The system of claim 24, wherein the same location of the virtual object in the first and second images is at the center of each of the respective images.

26. The system of claim 24, wherein the hand-held device includes a housing enclosing both the gyro sensor and the at least one processor.

27. The system of claim 24, further comprising a display disposed on the hand-held device and configured to display the first and second images.

28. The system of claim 24, wherein the simultaneous change in orientation and change in position of the virtual camera cause the location of the virtual object to remain at the same location in the first image and the second image.

29. The method of claim 1, wherein the virtual camera moves to the second position corresponding to a detected change in velocity of the electronic device.

* * * * *